(12) United States Patent
Okitsu et al.

(10) Patent No.: US 10,578,069 B2
(45) Date of Patent: Mar. 3, 2020

(54) INFORMATION PROVIDING METHOD FOR VEHICLE AND INFORMATION PROVIDING DEVICE FOR VEHICLE

(71) Applicant: Nissan Motor Co., Ltd., Yokohama-shi, Kanagawa (JP)

(72) Inventors: Yuta Okitsu, Kanagawa (JP);
Hiromoto Shimizu, Kanagawa (JP);
Haruki Satou, Kanagawa (JP);
Tadafumi Noji, Kanagawa (JP);
Tetsuya Shinohara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/448,787

(22) Filed: Jun. 21, 2019

(65) Prior Publication Data
US 2019/0309722 A1    Oct. 10, 2019

Related U.S. Application Data

(62) Division of application No. 15/767,407, filed as application No. PCT/JP2015/005470 on Oct. 30, 2015, now Pat. No. 10,451,021.

(51) Int. Cl.
*F02N 11/08*    (2006.01)
*F02D 29/02*    (2006.01)
(Continued)

(52) U.S. Cl.
CPC ......... *F02N 11/0822* (2013.01); *B60W 10/06* (2013.01); *B60W 50/14* (2013.01);
(Continued)

(58) Field of Classification Search
CPC ......... F02N 11/0822; F02N 2200/0801; F02N 2200/102; B60W 50/14; B60W 10/06; F02D 29/02
See application file for complete search history.

(56) References Cited

U.S. PATENT DOCUMENTS 9,224,255 B2    12/2015  Yagi et al.
10,252,728 B2 *  4/2019  Okitsu .................. B60T 13/662
(Continued)

FOREIGN PATENT DOCUMENTS

DE    10 2006 014 850 A1    10/2006
DE    10 2011 115 669 A1     3/2013
(Continued)

*Primary Examiner* — Carl C Staubach
(74) *Attorney, Agent, or Firm* — Global IP Counselors, LLP

(57) ABSTRACT

In an information providing method and device for a vehicle, an engine of the vehicle is stopped automatically when a predetermined permission condition is satisfied in a state in which the vehicle is stopped by a brake operation executed by a driver. The driver is notified of support information for satisfying the permission condition when the permission condition is not satisfied in the state in which the vehicle is stopped by the brake operation. A vehicle stop keeping control generates a braking force capable of maintaining a vehicle stopped state even when the brake operation decreases. The notification of the support information is stopped when it is determined that the brake operation has been released and a notification continuation time has elapsed since the brake operation was released during a state in which the support information is being notified and the vehicle stop keeping control is in operation.

8 Claims, 5 Drawing Sheets

(51) Int. Cl.
  *F02D 45/00*  (2006.01)
  *B60W 10/06*  (2006.01)
  *B60W 50/14*  (2020.01)
  *F02D 41/22*  (2006.01)

(52) U.S. Cl.
  CPC ............ *F02D 29/02* (2013.01); *F02D 45/00* (2013.01); *F02N 11/0833* (2013.01); *F02N 11/0844* (2013.01); *F02D 2041/228* (2013.01); *F02N 2200/0801* (2013.01); *F02N 2200/102* (2013.01); *Y02T 10/48* (2013.01)

(56) References Cited

U.S. PATENT DOCUMENTS

| | | | |
|---|---|---|---|
| 10,451,021 B2* | 10/2019 | Okitsu | ............... F02N 11/0844 |
| 2005/0199209 A1 | 9/2005 | Shimokawa et al. | |
| 2006/0224279 A1 | 10/2006 | Mori | |
| 2010/0106390 A1 | 4/2010 | Yamaguchi | |
| 2011/0144876 A1 | 6/2011 | Miah | |
| 2016/0297415 A1 | 10/2016 | Kato | |
| 2017/0110021 A1 | 4/2017 | Skagius et al. | |
| 2018/0306128 A1 | 10/2018 | Okitsu et al. | |
| 2018/0312171 A1 | 11/2018 | Okitsu et al. | |

FOREIGN PATENT DOCUMENTS

| | | |
|---|---|---|
| JP | 2012-246844 A | 12/2012 |
| JP | 2014-159752 A | 9/2014 |
| JP | 2015-93629 A | 5/2015 |
| WO | 2015/075526 A1 | 5/2015 |

* cited by examiner

INFORMATION PROVIDING METHOD FOR VEHICLE AND INFORMATION PROVIDING DEVICE FOR VEHICLE

CROSS-REFERENCE TO RELATED APPLICATIONS

This application is a divisional application of U.S. patent application Ser. No. 15/767,407, filed Apr. 11, 2018, which is a U.S. national stage application of International Patent Application No. PCT/JP2015/005470, filed on Oct. 30, 2015. The entire contents of U.S. patent application Ser. No. 15/767,407 and International Patent Application No. PCT/2015/005470 are hereby incorporated herein by reference.

BACKGROUND

Field of the Invention

The present invention relates to an information providing method for a vehicle and an information providing device for a vehicle.

Background Information

Conventionally, in an idle stop technique (also referred to as an idle reduction, idling stop) that automatically stops an engine, a technique is known for informing or notifying the driver of a control state, for example, as described in Japanese Laid-open Patent Application No. 2014-159752 A, hereinafter "Patent Document 1." According to the technique described in Patent Document 1, in an idle stop unactuated state or the out-of-operation of the idle stop, information for prompting an idle stop to encourage the driver to stop the engine (in the description below, referred to as "support information") will be displayed by an indicator light and the like to inform a driver. Note that the out-of-operation of the idle stop is caused by a state in which an operation amount of a brake pedal by the driver is less than a predetermined value, for example. Further, the support information indicates information and the like such that the operation amount of the brake pedal will be encouraged or urged to reach a predetermined value or more.

SUMMARY

However, in the technique described above in Patent Document 1, a problem likely to occur is that the support information will be continuously broadcast even when the driver does not want the operation of the idle stop in situations that the operation amount of the brake pedal is kept less than the predetermined value. The present invention has been made in view of the above problem and aims to provide an information providing method for a vehicle and an information providing device for a vehicle in which the notification of the support information is able to be stopped in situations where the driver does not want the operation of the idle stop.

In order to solve the above problem, according to one aspect of the present invention, the engine will be caused to be stopped automatically when a predetermined permission condition is satisfied in a state in which the vehicle is stopped with a brake operation by the driver. Further, when the permission condition is not satisfied or established in the state in which the vehicle is stopped by the brake operation, support information for satisfying the permission condition is notified to the driver. Furthermore, in a state in which the support information is being notified and a vehicle stop keeping control for generating a braking force capable of maintaining the vehicle in a stopped state even if the brake operation is reduced is activated, then the notification of the support information will be stopped upon determining that the driver has released the brake and a notification continuation time has elapsed.

According to one aspect of the present invention, in a state in which the support information is notified and the vehicle stop keeping control is in operation, the notification of the support information is stopped when it is determined that the notification continuation time has elapsed since it was determined that the brake operation was released. Thus, it is possible to provide an information providing method and an information providing device for a vehicle that can stop the notification of the support information in a situation where the driver does not want the operation of the idle stop.

DETAILED DESCRIPTION OF THE EMBODIMENTS

In the following detailed description, a description will be given of specific details of embodiments according to the present invention so as to provide a thorough understanding. However, even without such specific details, it is clear that one or more embodiments may be implemented. Further, in order to be concise with the drawings, well-known structures and devices may be shown only schematically.

First Embodiment

Below, a description will be given of a first embodiment according to the present invention with reference to the drawings.

Configuration of Information Providing Device for Vehicle

Figure 1:
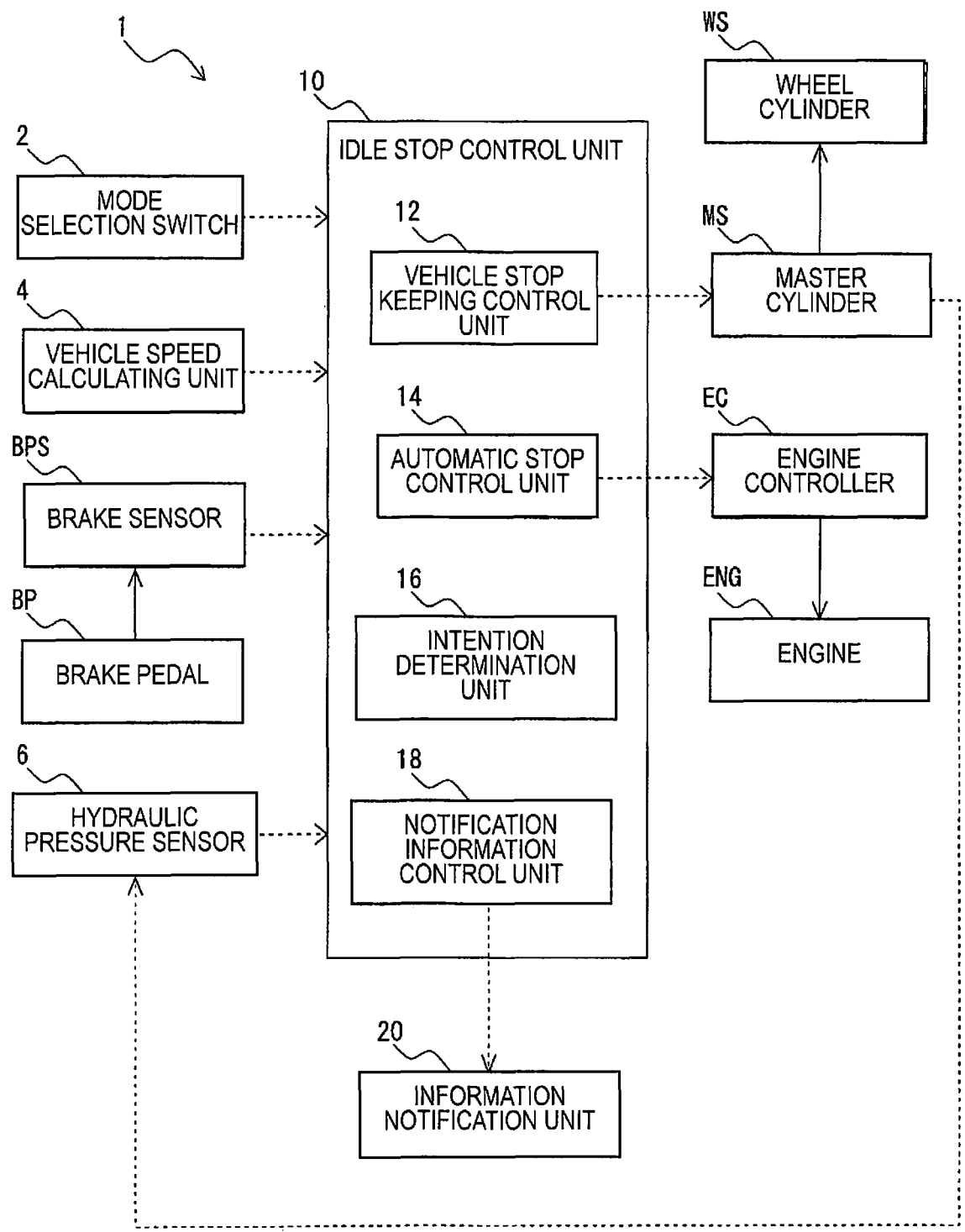
FIG. 1 is a block diagram showing a configuration of a vehicle information providing device of a first embodiment according to the present invention.
Figure 2:
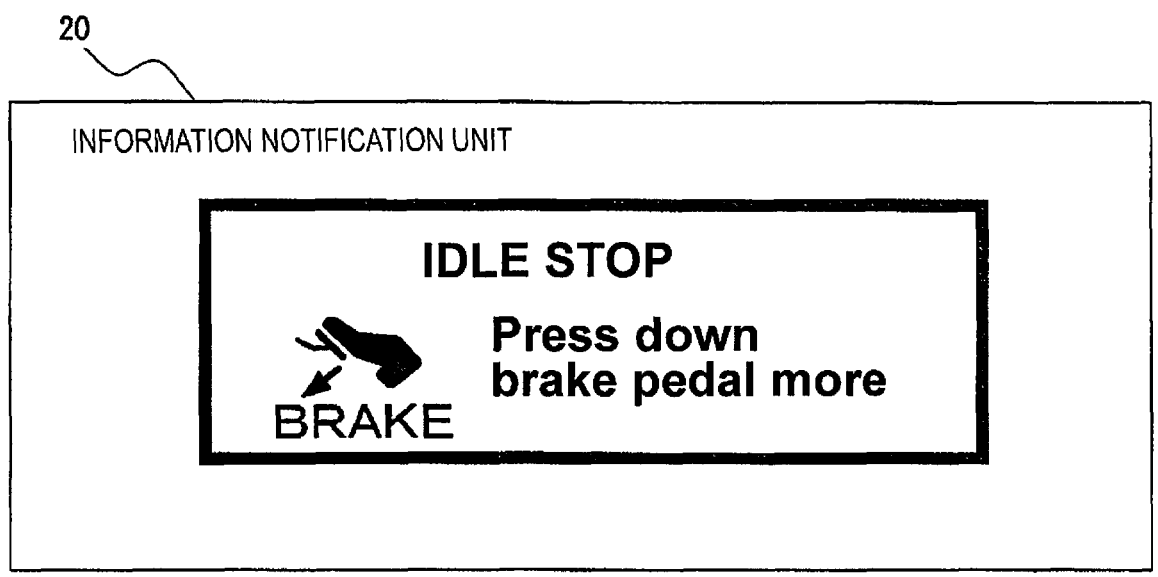
FIG. 2 is a diagram showing a state in which support information is turned on or lit on a display device.

With reference to FIGS. 1 and 2, the configuration of the vehicle information providing device 1 in the first embodiment is described. As represented in FIG. 1, the information providing device for a vehicle 1 includes an idle stop control unit 10 and an information notification unit 20. The idle stop control unit 10 is configured, for example, by a microcomputer, and is mounted on a vehicle equipped with a vehicle information providing device 1 (in the description below, referred to as "vehicle"). Incidentally, the microcomputer is configured with, for example, a CPU (Central Processing Unit), a RAM (Random Access Memory), and a ROM (Read Only Memory). Further, the idle stop control unit 10 receives input of information signals of a mode selection switch 2, a vehicle speed calculating unit 4, a brake sensor BPS, and a hydraulic pressure sensor 6.

The mode selection switch 2 is a switch for selecting whether or not to perform a vehicle stop keeping control (also referred to as SSA: Stand-Still-Assist). The vehicle stop keeping control is a control for generating a braking force capable of maintaining the vehicle stopped state even when the driver decreases the operation amount of the brake pedal BP from a state in which the vehicle is being stopped (vehicle stopped state) with the operation of the brake pedal BP by the driver. That is, the vehicle stop keeping control is a control for generating a braking force that is capable of maintaining the vehicle stopped state even when the brake operation is decreased. In the first embodiment, as an example, a description will be given of a control in which the vehicle stop maintaining control is executed during transition from a state in which the vehicle is stopped by the operation of the brake pedal BP by the driver to a state in which the braking force is generated such that the vehicle stop state may be maintained even when the brake pedal BP is released by the driver.

In other words, the vehicle stop keeping control is provided for generating a braking force capable of maintaining a vehicle stopped state as a control performed automatically on the vehicle side, irrespective of manual operation of the brake pedal BP by the driver. Note that "the brake pedal BP is released by the driver" is synonymous with the degree of opening of the brake pedal BP is brought to 0°. Also, an information signal including the selection result of the vehicle stop keeping control (in the description below, also referred to as "control selection signal") is outputted from the mode selection switch 2 to the idle stop control unit 10.

The vehicle speed calculating unit 4 receives an input of wheel speed signals from a wheel speed sensor (not shown) including a rotational speed of a wheel of the vehicle. Further, the vehicle speed calculating unit 4 uses the rotational speed included in the wheel speed signal to calculate a running speed of the vehicle (in the description below, also referred to as "vehicle speed"). Additionally, the vehicle speed calculating unit 4 outputs to the idle stop control unit 10 information signals including the calculated vehicle speed (in the description below, also referred to as "vehicle speed signal"). Note that the vehicle speed calculating unit 4, for example, may be configured to include a known VDC (Vehicle Dynamics Control) system. The wheel speed sensor is mounted on a vehicle. Further, the wheel speed sensor generates a predetermined number of vehicle speed pulses with respect to a vehicle mounted wheel per revolution of the wheel.

The brake sensor BPS is a sensor for detecting the operation amount of the brake pedal BP by the driver (depression amount). The brake pedal BP is a pedal that is subject to be depressed by the driver depending only on the braking force demand. The brake sensor BPS outputs to the idle stop control unit 10 an information signal including the operation amount of the brake pedal BP by the driver. Incidentally, the brake sensor BPS is formed, for example, by using a pedal stroke sensor. Further, the configuration of the brake sensor BPS is not limited to the structure formed by using the pedal stroke sensor. For example, it may be configured to detect a pressure of a master cylinder MS caused by depression operation of the driver (master cylinder pressure). That is, the brake sensor BPS is a sensor that detects the operation amount of the brake pedal BP by the driver (the brake operation).

The hydraulic pressure sensor 6 detects a hydraulic pressure of the brake fluid supplied from the master cylinder MS to a hydraulic system of the brake fluid (e.g., dual systems including primary system and secondary system). The hydraulic pressure sensor 6 (in the description below, also referred to as "hydraulic signal") outputs to the idle stop control unit 10 information signal including the detected hydraulic pressure. The notification unit 20 is formed, for example, by using a display device (indicator) arranged in a combination meter or instrument cluster. In addition, the combination meter is installed in an instrument panel of the driver's seat. In accordance with the information signal input from the idle stop control unit 10, the information notification unit 20 selectively causes a display device disposed in the combination meter to present the support information shown in FIG. 2 or to turn off the presented support information.

In a state where the vehicle stop keeping control is activated, the support information represents information necessary to establish the permission condition for carrying out the automatic stop of the engine (which is synonymous with idle stop, idle reduction, and idling stop). That is, the support information is information for establishing permission condition for automatic engine stop. Note that the "state where the vehicle stop keeping control is activated" represents a state in which, regardless of the operation of the brake pedal BP by the driver, a braking force that can maintain the stopped state of the vehicle is being generated by a control executed automatically by the vehicle.

The permission condition is a condition that has been set in advance. In the first embodiment, as an example, a description will be given in a case where the permission condition is defined as the condition in which the hydraulic pressure of the brake corresponding to the operation amount of the brake pedal BP reaches a predetermined permission hydraulic pressure or more. Thus, in a state in which the brake hydraulic pressure corresponding to the operation amount of the brake pedal BP is less than the permission hydraulic pressure, the support information illustrated in FIG. 2 is presented to prompt the driver to increase the operation amount of the brake pedal BP in order to allow the brake hydraulic pressure to reach the permission hydraulic pressure or more. Incidentally, the permission hydraulic pressure is set, for example, to a pressure higher than a brake hydraulic pressure that is able to maintain the stopped state of the vehicle on road surface of normal state, for example, on a snow-free flat road surface.

The display that prompts the driver to increase the operation amount of the brake pedal BP is, specifically, written information expressing "Please further depress the brake" or a display of icons representing the graphical relationship between the brake pedal BP and a driver's foot. Further, the permission condition may include conditions, for example, that steering angle of a steering wheel is within a threshold steering angle set in advance, the turning direction indicator is off, and/or shift position is at the drive range ("D" range, etc.). That is, the notification unit 20 is configured to notify an occupant of the vehicle of the support information for establishing the permission condition. Note that the notification unit 20 may display information indicating that the vehicle stop keeping control is in operation (e.g., written information such as "SSA in operation").

Further, the idle stop control unit 10 includes a vehicle stop keeping control unit 12, an automatic stop control unit 14, an intention determination unit 16, and a notification information control unit 18. The vehicle stop keeping control unit 12 refers to a control selection signal received from the mode selection switch 2. Then, when the control selection signal includes the selection result of performing the vehicle stop keeping control, reference will be made to the vehicle speed signal input from the vehicle speed calculating unit 4 and the information signal input from the brake sensor BPS. Furthermore, the vehicle stop keeping control unit 12 determines whether or not to operate the vehicle stop keeping control in response to the vehicle speed included in the vehicle speed signal and the operation amount of the brake pedal BP included in the information signal received from the brake sensor BPS.

Specifically, when conditions A1 and A2 below are satisfied, a determination will be made to operate the vehicle stop keeping control. Conditions A1: Vehicle speed is zero (i.e., synonymous with 0 km/h, the same shall apply below). That is, the vehicle is stopped. Conditions A2: Operation amount of the brake pedal BP is a predetermined amount or more (e.g., zero or the amount to overcome creep torque, also the same applies in the following description). That is, the brake pedal BP is operated. When the vehicle stop keeping control unit 12 determines to execute the vehicle stop keeping control, a command value for generating a braking force capable of maintaining the vehicle stop state of the vehicle (in the following description, also referred to as "vehicle stop keeping command value") is outputted to the master cylinder MS.

Furthermore, when it has determined to execute the vehicle stop keeping control, the vehicle stop keeping control unit 12 outputs an information signal to the automatic stop control unit 14. The information signal (which may also be referred to as "vehicle stop keeping decision signal" in the following description) includes the determination result indicating to operate the vehicle stop keeping control. Additionally, when it has determined to execute the vehicle stop keeping control, the stop keeping control unit 12 supplies the vehicle stop keeping decision signal to the intention determination unit 16 and the notification information control unit 18. Upon receiving an input of vehicle stop keeping determination signal from the vehicle stop keeping control unit 12, the automatic stop control unit 14 determines whether or not the permission condition is satisfied. If it is determined that the permission condition is satisfied, a command to stop the running engine ENG (may be referred to as "engine stop command" in the description below), is outputted to the engine controller EC and the notification information control unit 18. Thus, when the permission condition is satisfied in a state where the braking force capable of maintaining the vehicle stop state is being generated, the automatic stop control unit 14 causes the running engine ENG to stop automatically (i.e., causes idle stop, idle reduction, or idling stop).

The intention determination unit 16 determines whether the driver intends to request an automatic stop of the engine ENG in the driving state. Thus, the intention determination unit 16 determines whether or not the driver wishes to automatically stop the engine ENG. Specifically, when receiving an input of vehicle stop keeping determination signal from the vehicle stop keeping control unit 12, reference is made to the information signal input from the brake sensor BPS. Then, when a state is confirmed in which the operation amount of the brake pedal BP included in the information signal input from the brake sensor BPS is not changed, or when the operation of the brake pedal BP is released to be zero, it is determined that the driver does not wish to stop the engine ENG automatically.

In other words, the intention determination unit 16 in the first embodiment determines that the driver does not want to automatically stop the engine ENG when the driver releases the operation of the brake pedal BP while the vehicle stop keeping control is in operation. When it determines that the driver does not wish to automatically stop the engine ENG, the driver intention determination unit 16 outputs a no-necessity determination signal to the notification information control unit 18. The non-necessity determination signal represents an information signal including the determination result that the driver does not wish to automatically stop the engine ENG.

When it receives an input of the vehicle stop keeping determination signal from the vehicle stop keeping control unit 12, the notification information control unit 18 determines whether an input of the engine stop command is being received from the automatic stop control unit 14. That is, when the vehicle stop keeping control is in progress, the notification information control unit 18 determines whether the permission condition is satisfied. In a state where input of the vehicle stop keeping determination signal is received from the vehicle stop keeping control unit 12 but input of the engine stop command is not received from the automatic stop control unit 14, a determination will be made that the permission condition is not satisfied when the vehicle stop keeping control is in progress. Furthermore, an information signal (in the description below, also referred to as "information light-up signal") including a command for lighting the support information on the display device is outputted to the information notification unit 20.

Further, after it outputs the support information light-up signal to the information notification unit 20, the notification information control unit 18 determines whether the intention determination unit 16 receives the input of the no-necessity determination signal. When the no-necessity determination signal is received from the intention determination unit 16, the information signal (may also be referred to as "information off signal" in the description below) including a command to turn off the support information is outputted to the information notification unit 20. In the first embodiment, an example is given in which the configuration of the notification information control unit 18 is such that, after a notification continuation time upon receipt of the input of the no-necessity determination signal has elapsed, the information off signal is outputted to the information notification unit 20. The notification continuation time is a preset time. Further, the notification continuation time is set, for example, according to a vehicle class (corresponding to a body size and/or an exhaust amount of engine ENG, rating of the vehicle, etc.) and, depending on the position (viewing position) of the display device provided in the information notification unit 20. In the first embodiment, as an example, the notification continuation time is set to 2 sec.

In the first embodiment, an example is given for a case where the configuration of the notification information control unit 18 is made as described below. Specifically, the notification information control unit 18 of the first embodiment is configured such that, until a notification reserved time has elapsed from the start of the notification of the support information, even when determined that the driver does not wish to automatically stop the engine ENG, stopping of the notification of the support information is delayed. The notification reserved time is a preset time. Further, the notification reserved time is set, similar to the notification continuation time, according to, for example, the vehicle class, the position (viewing position) of the display device provided in the information notification unit 20. In the first embodiment, as an example, the notification reserved time is set to 2 sec.

Thus, the notification information control unit 18 causes the information notification unit 20 to notify the support information when the permission condition is not satisfied in a state in which the vehicle stop keeping control is operating or in operation. Further, in a state in which the support information is notified from the information notification unit 20, the notification of the support information is stopped when determined that the driver does not wish to stop the engine automatically. Furthermore, the notification information control unit 18 is configured such that, in a state in which the support information is notified, a time interval is set as a predetermined notification continuation time between a determination that the driver does not wish to stop the engine ENG automatically and actually stopping the notification of the support information.

The master cylinder MS is a device for supplying the brake oil (brake fluid) to the wheel cylinder WS. In response to receiving the stop keeping command value from the idle stop control unit 10, the master cylinder MS moves a piston inside the master cylinder MS by operating a braking motor (not shown) accommodated in the master cylinder MS. Thus, in the master cylinder MS, a hydraulic pressure is generated corresponding to the vehicle stop keeping command value. Then, the hydraulic pressure of the brake fluid in accordance with the stop keeping command value is supplied to the wheel cylinder WS.

The wheel cylinder WS is operable to generate a pressing force for pressing a brake pad constituting the disk brake (not shown) to a disk rotor (not shown). The disk rotor rotates integrally with the wheel W, and frictional resistance is generated by contacting the brake pad. That is, the master cylinder MS and the wheel cylinder WS are mounted on the wheel to form a friction brake to generate a frictional braking force on the wheels. The engine controller EC is operable to stop the engine ENG in operation in response to an engine stop command received from the idle stop control unit 10. The engine ENG forms a driving force or torque source of the vehicle. As described above, the idle stop control unit 10 uses the various types of information signals received to control the master cylinder MS, the engine controller EC, and the information notification unit 20 provided in the vehicle.

Processing Performed by Idle Stop Control Unit 10

Figure 3:
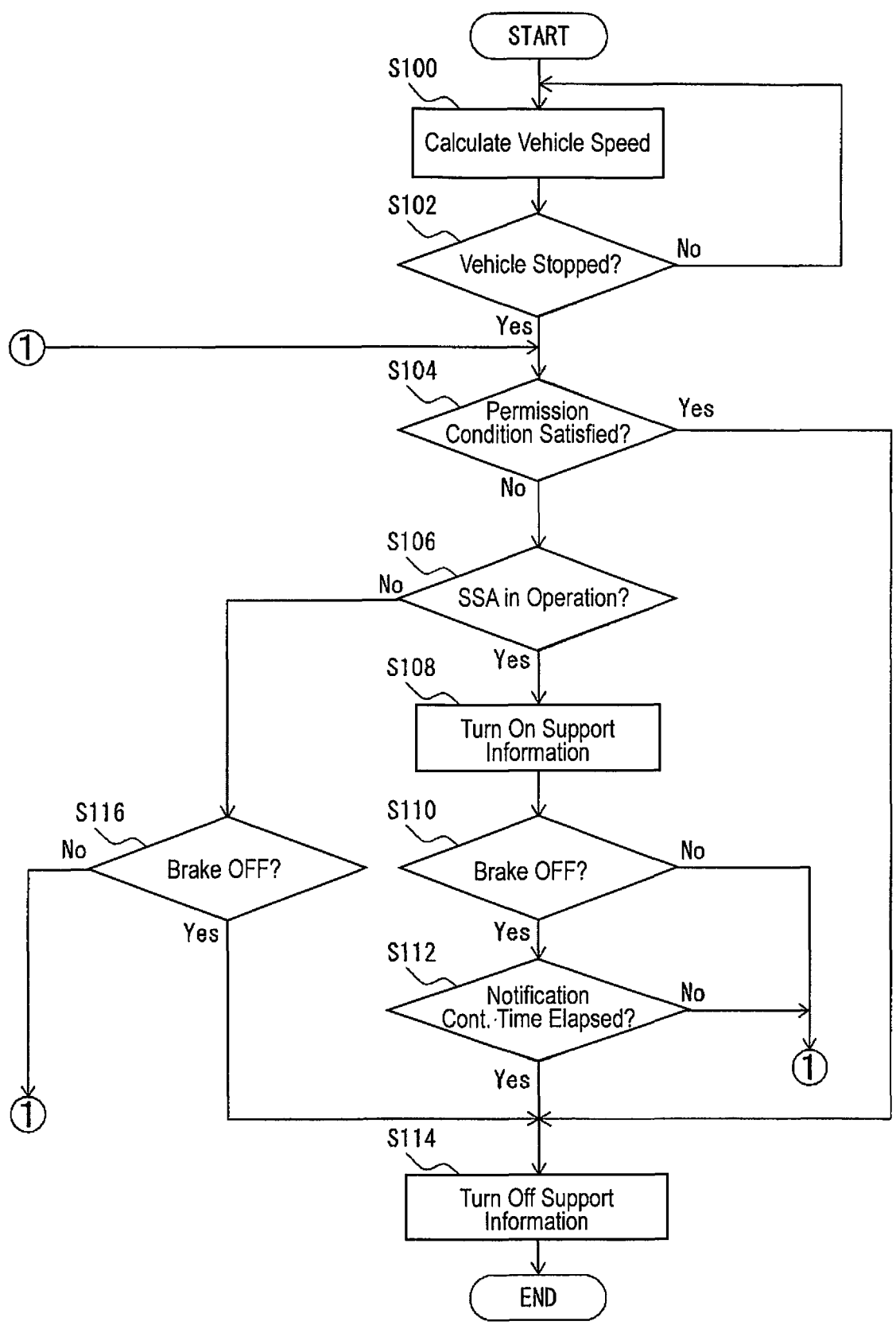
FIG. 3 is a flow chart showing processing of the vehicle information providing device that implements the first embodiment according to the present invention.

With reference to FIGS. 1 and 2, and using FIG. 3, an example of processing performed by the idle stop control unit 10 is given. In the description below, the processing of the idle stop control unit 10 may be referred to as "the vehicle control process". Further, the process illustrated in FIG. 3 specifies the processing in a case in which the mode selection switch 2 is selected to perform the vehicle stop keeping control. As represented in FIG. 3, upon starting the vehicle control process (START), processing of step S100 is executed. In step S100, the vehicle speed calculating device 4 calculates the vehicle speed (expressed in FIG. 3 as "Calculate Vehicle Speed"). After calculating the vehicle speed in step S100, the vehicle control process proceeds to step S102.

In step S102, it is determined whether or not the vehicle is stopped (expressed in FIG. 3 as "Vehicle Stopped?") by confirming that the vehicle speed calculated in step S100 is zero. When determined in step S102 that the vehicle is stopped (expressed in FIG. 3 as "Yes"), the vehicle control process proceeds to step S104. On the other hand, in step S102, when determined that the vehicle is not stopped (expressed in FIG. 3 as "No"), the vehicle control process proceeds to step S100. In step S104, by the automatic stop control unit 14, processing is performed for determining whether or not a permission condition is satisfied (expressed in FIG. 3 as "Permission Condition Satisfied?"). In step S104, when the permission condition is determined to be satisfied (represented in FIG. 3 as "Yes"), the vehicle control process proceeds to step S114. On the other hand, in step S104, when determined that the permission condition is not satisfied (expressed in FIG. 3 as "No"), the vehicle control process proceeds to step S106.

In step S106, processing is performed by the vehicle stop keeping control unit 12 for determining whether or not the vehicle stop keeping command value is outputted to the master cylinder MS. That is, processing is carried out in step S106 for determining whether or not the vehicle stop keeping control is activated and in operation (expressed in FIG. 3 as "SSA in Operation?"). In step S106, when the vehicle stop keeping control is determined to be in operation (expressed in FIG. 3 as "Yes"), the vehicle control process proceeds to step S108. On the other hand, in step S106, when determined that the vehicle stop keeping control is not in operation (expressed in FIG. 3 as "No"), the vehicle control process proceeds to step S116.

In step S108, the information turn on or light-up signal is output from the notification information control unit 18 to the information notification unit 20. Thus, in step S108, the support information is lit on the display device (represented in FIG. 3 as "Turn on Support Information"). In step S108, when the support information is lit on the display device, the vehicle control process proceeds to step S110. In step S110, processing is performed by the intention determination unit 16 to determine whether or not the operation amount of the brake pedal BP is zero (expressed in FIG. 3 as "Brake OFF?"). When determined in step S110 that the operation amount of the brake pedal BP is zero (expressed in FIG. 3 as "Yes"), the vehicle control process proceeds to step S112. On the other hand, in step S110, when determined that the operation amount of the brake pedal BP is greater than zero (represented in FIG. 3 as "No"), the vehicle control process proceeds to step S116.

In step S112, the notification information control unit 18 determines whether or not the notification continuation time (2 sec) has elapsed after the operation amount of the brake pedal BP is determined to be zero in step S110 (expressed in FIG. 3 as "Notification Continuation Time Elapsed?"). In step S112, when it is determined that the notification continuation time has elapsed since the operation amount of the brake pedal BP being determined to be zero in step S110 (expressed in FIG. 3 as "Yes"), the vehicle control process proceeds to step S114. On the other hand, in step S112, when it is determined that the notification continuation time has not elapsed since the operation amount of the brake pedal BP is determined to be zero (expressed in FIG. 3 as "No") in step S110, the vehicle control process proceeds to step S104.

In step S114, the information turn off signal is output from the notification information control unit 18 to the information notification unit 20. Thus, in step S114, the support information that is lit on the display device will be turned off (expressed in FIG. 3 as "Turn Off Support Info."). In step S114, upon turning off the support information that has been lit on the display device, the vehicle control process ends (END). In step S116, similar to step S110, the intention determination unit 16 performs processing for determining whether or not the operation amount of the brake pedal BP is zero (expressed in FIG. 3 as "Brake OFF?"). In step S116, when the operation amount of the brake pedal BP is determined to be zero (expressed in FIG. 3 as "Yes"), the vehicle control process proceeds to step S114. On the other hand, in step S116, when determined that the operation amount of the brake pedal BP is greater than zero (expressed in FIG. 3 as "No"), the vehicle control process proceeds to step S104.

Operation

With reference to FIGS. 1 to 3, and using FIG. 4, an example will be explained of operations performed using the vehicle information providing device 1 of the first embodiment. Incidentally, in FIG. 4, a time chart of operations is shown, which are performed by the configuration according to the vehicle information providing device 1 in the first embodiment. Also, in the time chart shown in FIG. 4, a case is depicted in which the mode selection switch 2 is selected to put the vehicle stop keeping control in operation. The time chart shown in FIG. 4 starts from a state in which the driver operates or presses down a brake pedal BP (i.e., Brake ON) during travel of the vehicle (i.e., vehicle speed>0). Incidentally, in the profile represented by "Brake" in FIG. 4, a situation in which the operation amount of the brake pedal BP is zero is expressed as "OFF" while another situation in which the operation amount of the brake pedal BP exceeds zero is expressed as "ON".

Figure 4:
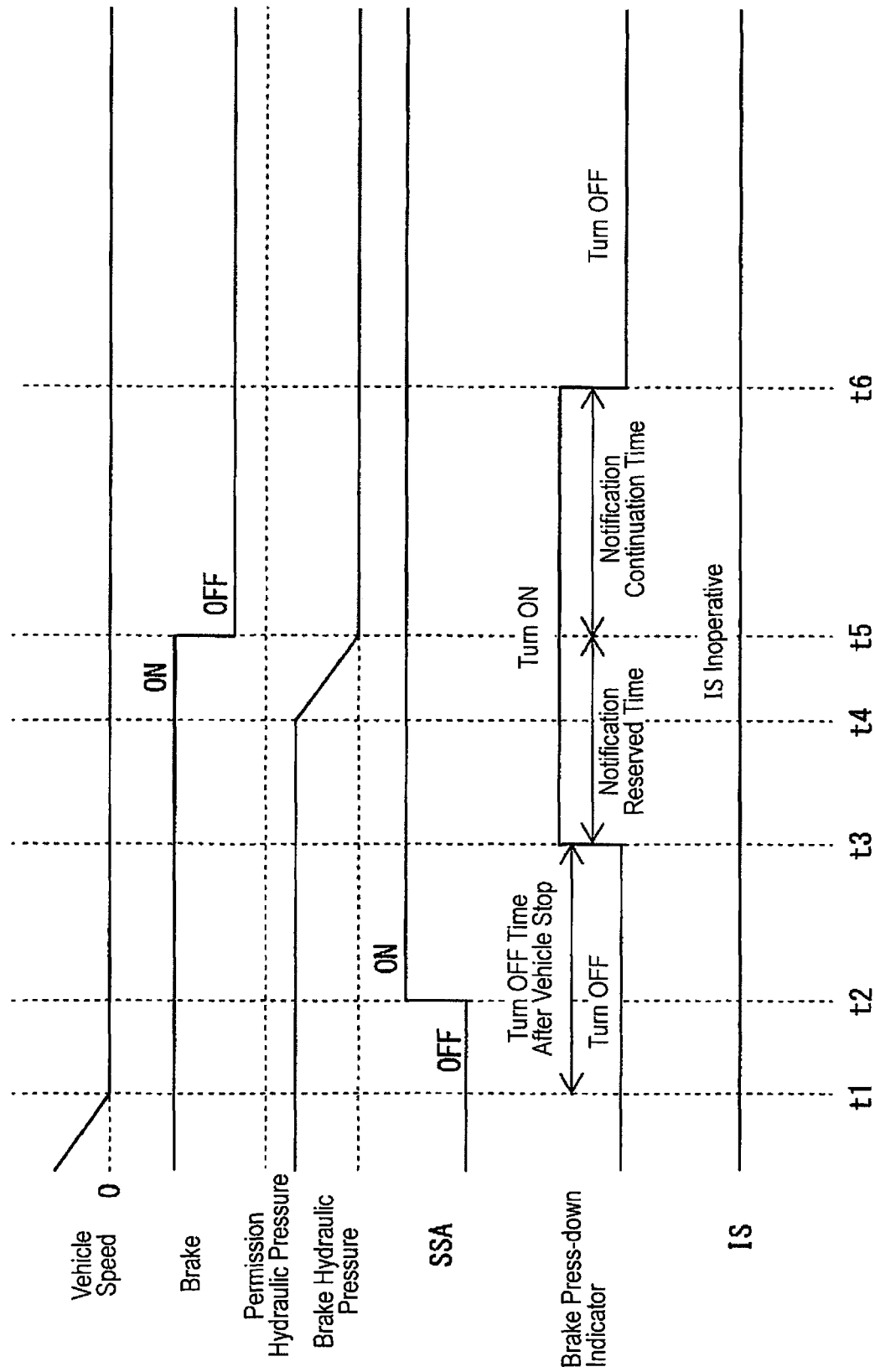
FIG. 4 is a time chart showing an operation of the vehicle to which a configuration of the vehicle information providing device in the first embodiment is applied according to the present invention.

At the starting time of the time chart shown in FIG. 4, since a brake fluid or hydraulic pressure corresponding to the operation amount of the brake pedal BP of the driver is generated, the vehicle speed decreases. Further, at the starting time of the time chart shown in FIG. 4, the vehicle stop keeping control is not in operation (SSA OFF). Thus, the support information is turned off (brake press-down prompting indicator is turned off). Furthermore, at the starting time of the time chart shown in FIG. 4, the engine is being driven. Thus, the idle stop is not in operation or activated (IS inoperative). Note that, on the profile represented by "SSA" in FIG. 4, a state in which the vehicle stop keeping control is in operation is expressed as "ON" while a state in which the vehicle stop keeping control is not in operation is expressed as "OFF". Similarly, in the profile graph represented by "Brake Press-down Prompting Indicator" in FIG. 4, a state in which the support information is lit is expressed as "Turn ON" while a state in which the support information is extinguished is expressed as "Turn OFF". Furthermore, in the profile represented by "IS" in FIG. 4, a state in which the idle stop is not in operation is expressed as "IS inoperative".

At the time (time t1) in FIG. 4 when the vehicle speed reaches zero, i.e., when the vehicle comes to stop, it is determined whether or not a condition is satisfied in which the operation amount of the brake pedal BP is greater than zero. Then, at the time at which the operation amount of the brake pedal BP is determined to be greater than zero (time t2), the vehicle stop keeping control (SSA ON) is operated. Incidentally, the brake hydraulic pressure at time t1 represents, for example, a brake hydraulic pressure that is great enough to maintain a vehicle stop state against a creep torque generated in the vehicle with the engine ENG being driven.

Further, the support information is turned on (i.e., brake press-down prompting indicator is turned on) at a point in time (time t3) when a predetermined post-vehicle-stop turn off time has elapsed. In the first embodiment, as an example, the post-vehicle-stop turn off time is set between 2 sec and 3 sec. After the time t3, the operation amount of the brake pedal BP by the driver starts decreasing (time t4). When the operation amount of the brake pedal BP reaches zero (time t5), the brake hydraulic pressure that started decreasing from time t4 reaches zero at the time t5 (expressed "0" in FIG. 4).

Note that the brake hydraulic pressure being zero has the same meaning as the brake hydraulic pressure attaining 0 $kg/cm^2$. That is, at time point t5, the operation amount of the brake pedal as well as the brake hydraulic pressure will reach zero (Brake OFF, Brake hydraulic pressure zero).

Further, on the time chart in FIG. 4, the permission condition is not satisfied up to the time point t4 because the brake hydraulic pressure is lower than the permission hydraulic pressure. Thus, the automatic stop of the engine ENG is not performed. In other words, from the start on the time chart shown in FIG. 4 to the time point t4, the engine is being driven and thus the idle stop is not performed (IS inoperative). Then, at a time (time t6) when a notification continuation time has elapsed from the time t5, the support information that was lit at the time t3 is extinguished (brake press-down indicator is turned off). Although not shown, in the operation performed using the vehicle information providing device 1 in the first embodiment, the support information will be turned off when an accelerator pedal provided in the vehicle is operated in a state in which the support information is turned on.

As described above, with the vehicle information providing device 1 of the first embodiment, a determination is made as to whether or not the driver wishes an automatic stop of the engine ENG to be performed when the vehicle stop keeping control is in operation. Subsequently, when it is determined that the driver does not wish to perform the automatic stop of the engine ENG, notification of the support information will be stopped. Accordingly, while the support information is being notified when the stop keeping control is in operation, it is possible to stop the notification of the support information when the driver does not wish to perform the operation of the idle stop.

As described above, according to the information providing method for a vehicle using the information providing device 1 of the first embodiment, the engine ENG is automatically stopped when a permission condition is satisfied in a state in which the vehicle is stopped by a brake operation of the driver (operation of brake pedal BP). Further, in a state in which the vehicle is stopped by the brake operation of the driver (operation of brake pedal BP), support information will be provided to the driver if the permission condition is not established. Furthermore, when the support information is being notified and the vehicle stop keeping control is in operation, the notification of the support information will be stopped upon if it is determined that the driver does not wish to stop the engine automatically.

In other words, despite the notification to the driver that the engine ENG will be stopped automatically if the brake operation is slightly increased, it is determined that the driver does not wish for the engine ENG to be stopped automatically judging from a state in which the driver does not increase depression of the brake pedal BP. Note that the state in which the driver does not increase depression of the brake pedal BP includes a state in which the driver maintains the operation amount of the brake pedal BP as well as a state in which the driver decreases the operation amount of the brake pedal BP. Incidentally, the first embodiment described above is an example of the present invention. The present invention is not limited to the first embodiment described above. Even in configurations other than the present embodiment, various modifications in design and the like are available unless they do not depart from the technical idea of the present invention.

Effects of the First Embodiment

According to the vehicle information providing method using the vehicle information providing device 1 in the first embodiment, it is possible to achieve the effects described below.

(1) When a permission condition is unsatisfied in a state in which the vehicle is stopped by a brake operation of the driver (depression of brake pedal BP), the support information is notified to the driver. Further, in a state in which the support information is being notified and the vehicle stop keeping control is in operation, the notification of the support information is stopped when it is determined that the driver does not wish to stop the engine ENG automatically. Thus, in a state in which the support information is being notified and the vehicle stop keeping control is in operation, the notification of the support information is stopped when it is determined that the driver does not wish to stop the engine ENG automatically. As a result, it is possible to stop notification of the support information in a situation in which the driver does not wish to operate the idle stop. Therefore, in the situation in which the driver does not wish to operate the idle stop, it is possible to prevent unnecessary support information from being continuously displayed.

(2) It is determined that the driver does not wish to stop the engine ENG automatically when the operation of the brake pedal BP is released while the vehicle stop keeping control is in operation. Thus, by detecting a vehicle speed and the operation amount of the brake pedal BP, it is possible to determine whether the driver wishes to stop the engine ENG automatically. As a result, using an existing configuration in the vehicle, it is possible to determine whether or not the driver wishes to stop the engine ENG automatically.

(3) In a state in which the support information is being notified, a time interval is set as a predetermined notification continuation time (e.g., 2 sec) that extends from the determination that the driver does not wish to stop the engine ENG automatically until the notification of the support information is stopped. Therefore, even when it is determined that the driver does not wish to automatically stop the engine ENG, it is possible to continue the notification of the support information for at least the duration of the notification continuation time. As a result, even when the driver does not wish to automatically stop the engine ENG, it is possible for the driver to increase the possibility of recognition (visually) of the support information.

(4) Stopping of notification of the support information is delayed until a notification reserved time elapses from start of notification of the support information, even when it is determined that the driver does not wish to step the engine ENG automatically. Therefore, even when it is determined that the driver does not wish to operate an automatic stop of the engine ENG, it is possible to notify the support information for at least the duration of the notification reserved time. As a result, even when the driver does not wish to automatically stop the engine ENG, it is possible to increase the possibility of recognition (visually) by the driver. In addition, with the vehicle information providing device 1 of the first embodiment, it is possible to achieve the effects below.

(5) In a state in which the vehicle is stopped due to operation of brake pedal BP by the driver, the automatic stop control unit 14 stops the engine ENG automatically when it is determined that the permission condition is satisfied. Further, the vehicle stop keeping control unit 12 executes a vehicle stop keeping control that causes a braking force to be generated that can maintain the vehicle stop state even when the driver decreases the brake operation from a state in which the vehicle is stopped by the operation of the brake pedal BP by the driver. In addition, in a state in which the vehicle is stopped by the operation of the brake pedal BP by the driver, the notification information control unit 18 notifies the support information from the information notification unit 20 when the permission condition is not satisfied. Furthermore, in a state in which the support information is being notified and the vehicle stop keeping control is in operation, the notification of the support information is stopped when the intention determination unit 16 determines that the driver does not wish to stop the engine ENG automatically.

Thus, when the support information is being notified and the vehicle stop keeping control is in operation, the notification of the support information is stopped upon determining that the driver does not wish to stop the engine ENG automatically. As a result, in a situation in which the driver does not wish to operate the idle stop, it is possible to stop the notification of the support information. Therefore, in situations in which the driver does not wish to operate the idle stop, it is possible to prevent the unnecessary support information from being continuously displayed.

Modifications of the First Embodiment (1) In the first embodiment, when the operation of the brake pedal BP is released with the vehicle stop keeping control in operation, it is determined that the driver does not wish to stop the engine ENG automatically. However, the configuration by which to determine whether or not the driver wishes to stop the engine ENG automatically is not limited to this example. More specifically, it is acceptable to adopt a configuration in which it is determined that the driver does not wish to stop the engine ENG automatically when the operation amount of the brake pedal BP decreases while the vehicle stop keeping control is in operation. In this case, on the time chart shown in FIG. 4, it is determined that the driver does not wish to stop the engine ENG automatically at the time t4. With this configuration, as compared with the configuration of the first embodiment, it is possible to shorten the time required to determine that the driver does not want to stop the engine ENG automatically.

(2) In the first embodiment, when the operation of the brake pedal BP is released with the vehicle stop keeping control being in operation, it is determined that the driver does not wish to stop the engine ENG automatically. However, the configuration by which to determine whether or not the driver wants to stop the engine ENG automatically is not limited to this example. More specifically, it is acceptable to adopt a configuration in which it is determined that the driver does not wish to stop the engine ENG automatically when the brake hydraulic pressure is less than a predetermined determination hydraulic pressure with the vehicle stop keeping control is in place. The determination hydraulic pressure is, for example, a hydraulic pressure which is set to less than the permission hydraulic pressure. The determination hydraulic pressure may be set to any value according to the vehicle class of the vehicle and the like. With this configuration, it is possible to determine that the driver does not wish to stop the engine ENG automatically even when the brake hydraulic pressure varies below the determination hydraulic pressure in response to the operation amount of the brake pedal BP by the driver. Thus, as compared with the configuration of the first embodiment, it is possible to shorten the time required to determine that the driver does not want to stop the engine ENG automatically.

(3) In the first embodiment, when the operation of the brake pedal BP is released with the vehicle stop keeping control in operation, it is determined that the driver does not wish to stop the engine ENG automatically. However, the configuration by which to determine whether or not the driver wishes to stop the engine ENG automatically is not limited to this example. More specifically, it is acceptable to adopt a configuration in which it is determined that the driver does not wish to stop the engine ENG automatically when the time the brake hydraulic pressure is less than a predetermined determination hydraulic pressure continues for a determination time period with the vehicle stop keeping control is in operation, it may be. In this configuration, it is possible to determine definitively that the driver does not wish to stop the engine ENG automatically even when the brake hydraulic pressure varies according to the operation amount of the brake pedal BP by the driver below the determination hydraulic pressure until the determination time period will expire. In this configuration, as compared with the configuration of the first embodiment, it is possible to improve the reliability to determine that the driver does not want to stop the engine ENG automatically.

Figure 5:
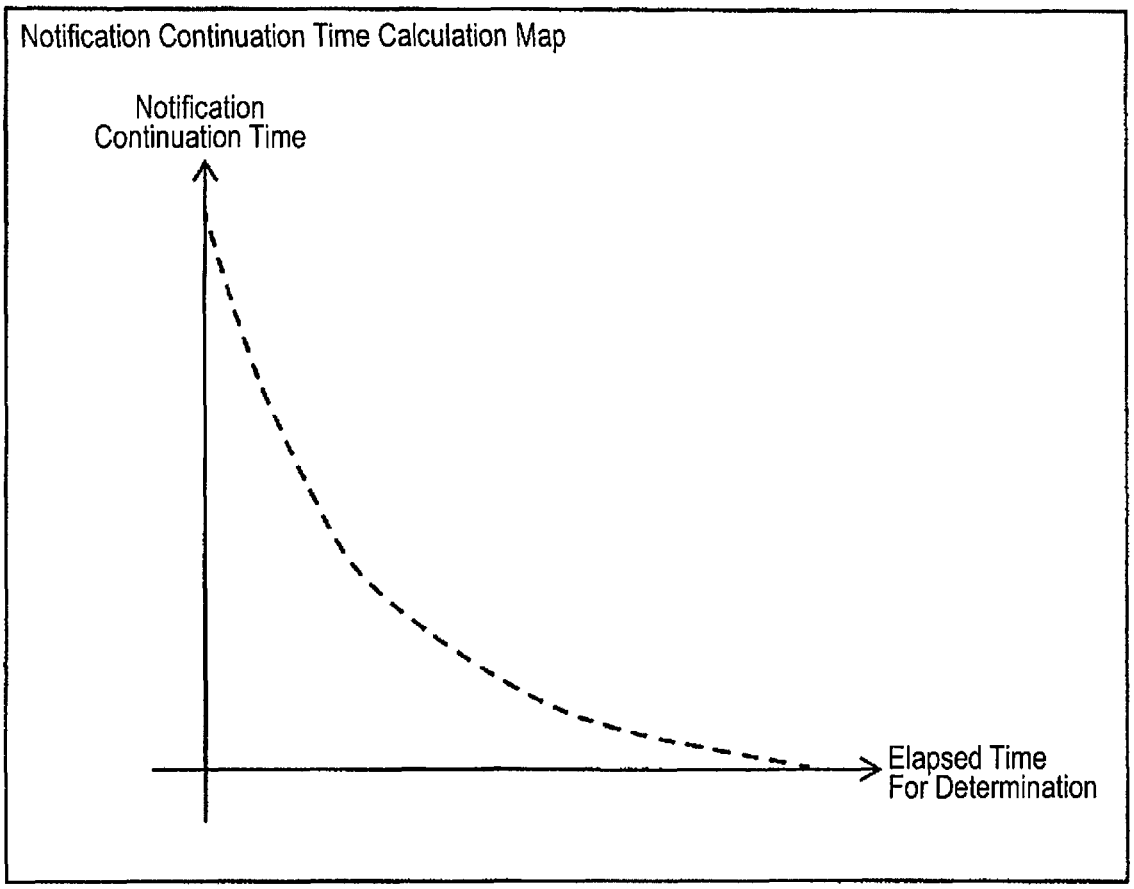
FIG. 5 is a diagram illustrating a modification of the first embodiment according the present invention.

(4) In the first embodiment, in a state in which the support information is notified, a time interval is set as a predetermined fixed value of notification continuation time between determination that the driver does not wish to stop the engine ENG automatically and stopping of the notification of the support information. However, the notification continuation time is not limited to this example. More specifically, the notification continuation time may be changed using the notification continuation time calculation map represented in FIG. 5. Specifically, the notification continuation time may be shorter as the time elapsed is longer from starting the determination of whether or not the driver wishes to stop the engine ENG automatically until it is determined that the driver does not wish to stop the engine ENG automatically. Note that in FIG. 5, on the horizontal axis, a time elapsed from the start of determination of whether or not the driver wishes to automatically stop the engine ENG until determination that the driver does not want to automatically stop the engine ENG is expressed as "elapsed time for determination". Also, the elapsed time for determination is the time during which lighting of the support information is continued. In this case, it is possible to correlate the determination as to whether or not the driver wishes to stop the engine ENG automatically and the length of time during which the support information is continuously notified.

(5) In the first embodiment, although the support information is an indication or display for prompting the driver to increase the operation amount of the brake pedal BP as shown in FIG. 2, the support information is not limited to this example. That is, the support information may be, for example, a sound (voice, alarm, etc.) to encourage the driver to increase the operation amount of the brake pedal BP.

(6) In the first embodiment, in a state in which the support information is notified, the time interval from the determination that driver does not wish to stop the engine ENG automatically until stopping the notification of the support information is set to the notification continuation time. However, the present invention is not limited to this example. That is, notification of the support information may be stopped at the point in time when it is determined that the driver does not wish to stop the engine ENG automatically (for example, at the time t5 represented in FIG. 4).

(7) In the first embodiment, the brake operation by the driver is specified as the operation of the brake pedal BP by the driver. However, the operation by the driver is not limited thereto. That is, when the configuration of the vehicle is such that, for example, a brake lever is provided for instructing the braking force of the vehicle by manipulating by hand, the operation of the brake lever by the driver may be interpreted as the brake operation by the driver.

What is claimed is:

1. An information providing method for a vehicle, the information providing method comprising:
    determining if the vehicle is stopped by a brake operation of the vehicle executed by a driver;
    determining if a permission condition is satisfied in a state in which the vehicle is stopped by the brake operation, the permission condition being related to carrying out an automatic stop of an engine of the vehicle;
    stopping the engine of the vehicle automatically upon determining that the permission condition is satisfied in a state in which the vehicle is stopped by the brake operation;
    starting notification to the driver of support information for satisfying the permission condition upon determining that the permission condition is not satisfied in the state in which the vehicle is stopped by the brake operation;
    starting a vehicle stop keeping control upon determining that the vehicle is stopped by the brake operation and a brake operation amount of the brake is larger than zero;
    determining if the brake operation has been released while the vehicle is in a state in which the support information is being notified and the vehicle stop keeping control is activated; and
    stopping the notification of the support information upon determining that a notification continuation time has elapsed since it was determined that the brake operation was released while the vehicle is in the state in which the support information is being notified and the vehicle stop keeping control is activated.

2. The information providing method according to claim 1, further comprising
    variably setting the notification continuation time using a notification continuation time calculation map.

3. The information providing method according to claim 1, wherein
    after starting the notification of the support information, continuing the notification of the support information at least until a notification reserved time has elapsed.

4. The information providing method according to claim 1, wherein
    the notification of the support information is started upon further determining that a turn off time has elapsed since the vehicle was stopped by the brake operation.

5. An information providing device for a vehicle, the information providing device comprising:
    a microcomputer programmed to execute an idle stop control to
        stop an engine of the vehicle automatically when a predetermined permission condition is satisfied in a state in which the vehicle is stopped by a brake operation of a brake of the vehicle executed by a driver,
        start a vehicle stop keeping control when the vehicle is stopped by the brake operation and a brake operation amount of the brake is larger than zero, the vehicle stop keeping control generating a braking force capable of maintaining a vehicle stopped state even when the brake operation decreases, determine whether the driver has released the brake operation of the brake after executing the brake operation, and determine whether a notification continuation time has elapsed since the driver released the brake operation after executing the brake operation; and an information notification device configured to notify the driver of support information for satisfying the permission condition in response to an instruction from the microcomputer, the microcomputer being configured to control the information notification device to notify the support information when the permission condition is not satisfied in the state in which the vehicle is stopped by the brake operation, and the microcomputer being further configured to stop the notification of the support information when the microcomputer makes the determination that the notification continuation time has elapsed since the driver released the brake operation in a state in which the support information is being notified and the vehicle stop keeping control is in operation.

6. The information providing device according to claim 5, wherein
the microcomputer is configured to set the notification continuation time variably using a notification continuation time calculation map.

7. The information providing device according to claim 5, wherein
the microcomputer is configured to set the notification continuation time to be shorter as an elapsed time becomes longer from starting the notification of the support information until determining that the driver released the brake operation after executing the brake operation.

8. The information providing device according to claim 5, wherein
the microcomputer is configured not to start the notification of the support information until further determining that a turn off time has elapsed since the vehicle was stopped by the brake operation.

* * * * *